Patented Feb. 20, 1934

1,948,161

UNITED STATES PATENT OFFICE 1,948,161

PARTIAL OXIDATION PRODUCTS

William P. Bitler, Nyack, N. Y., assignor to C. P. Byrnes, trustee, Sewickley, Pa.

No Drawing. Application July 24, 1929
Serial No. 380,770

1 Claim. (Cl. 260—139)

My invention relates to treating the liquid product from partial oxidation of hydrocarbons and particularly to preparing therefrom a distillate suitable as a denaturant for alcohols. For such purpose the distillate should be relatively free from organic acids, high boiling resins and metallic compounds, such as iron soaps, which are usually present in varying amounts in the initial product of oxidation. I have found a simple and cheap method of, and apparatus for, obtaining such desirable products.

The partial oxidation product treated contains at least a material proportion of oxygen derivatives of aliphatic hydrocarbons having sufficient carbon atoms to be insoluble in water, the mixture being of an oily nature. It contains aldehydes or aldehyde-like bodies and organic acid bodies insoluble in water.

In the preferred form, the liquid partial oxidation product, for example, that from the J. H. James' process of United States Patent No. 1,697,653, is agitated in a still with a saponifier, such as lime, to form lime soaps. I preferably use about eight pounds of lime per one hundred gallons of oxidized oil. The non-saponifiable oil is then distilled off while the agitation is continued to prevent the soaps from adhering to the walls of the still and burning thereon. Toward the end of the latter step, the lime soaps and resins take a colloidal state with the oil making it possible to drain the residue remaining in the still through a removable tar plug therein. If a horizontal cylindrical still is used with heat applied beneath, the agitator should scrape the interior of the still bottom to prevent sticking and burning.

The distillate thus obtained is light yellow in color, practically free from high boiling resins and metallic compounds, and has an acid number of less than 0.30. It contains a mixture of aldehydes, alcohols, unsaturated hydrocarbons and saturated hydrocarbons.

The method of saponifying and then distilling in the same vessel above is the preferred method of obtaining the desired distillate, though the liquid partial oxidation product of hydrocarbons may be first distilled to remove high boiling resins and any metallic compounds, which are left in the still, an aluminum condenser being preferably used to prevent the distillate from becoming contaminated with metallic compounds. The distillate may then be treated with about 50% excess of 10% caustic soda solution in a wooden tank with an agitator. For example, if a titration on the distillate gives an acid number of eleven (11) this would indicate that 7.86# 10% sodium hydroxide solution to 100# of distillate would be required by theory to react with the acids present. In order to remove all the acids a 50% excess of this amount or 11.79# of 10% caustic soda solution to 100# of distillate is used. The caustic liquor containing most of the acids in the form of sodium soaps is then drained off and the acid-free oil may be again distilled to remove any oil-soluble soaps. The latter method is slower and more expensive than the preferred method. Changes may be made in the saponifier used, fractionating may be effected in other ways and other changes may be made without departing from my invention.

I claim:

As a new composition of matter, a liquid fraction of an oily mixture of oxygen derivatives of hydrocarbons containing a material proportion of oxygen derivatives of aliphatic hydrocarbons of different molecular weights having sufficient carbon atoms to be insoluble in water, said fraction being substantially free from organic acids, high boiling resins and metallic compounds and containing a material proportion of different bodies insoluble in water and of the same type but of different molecular weights.

WM. P. BITLER.